Aug. 19, 1958 P. H. WERENFELS 2,848,529
COLOR TELEVISION SYNCHRONIZATION
Filed Nov. 30, 1953
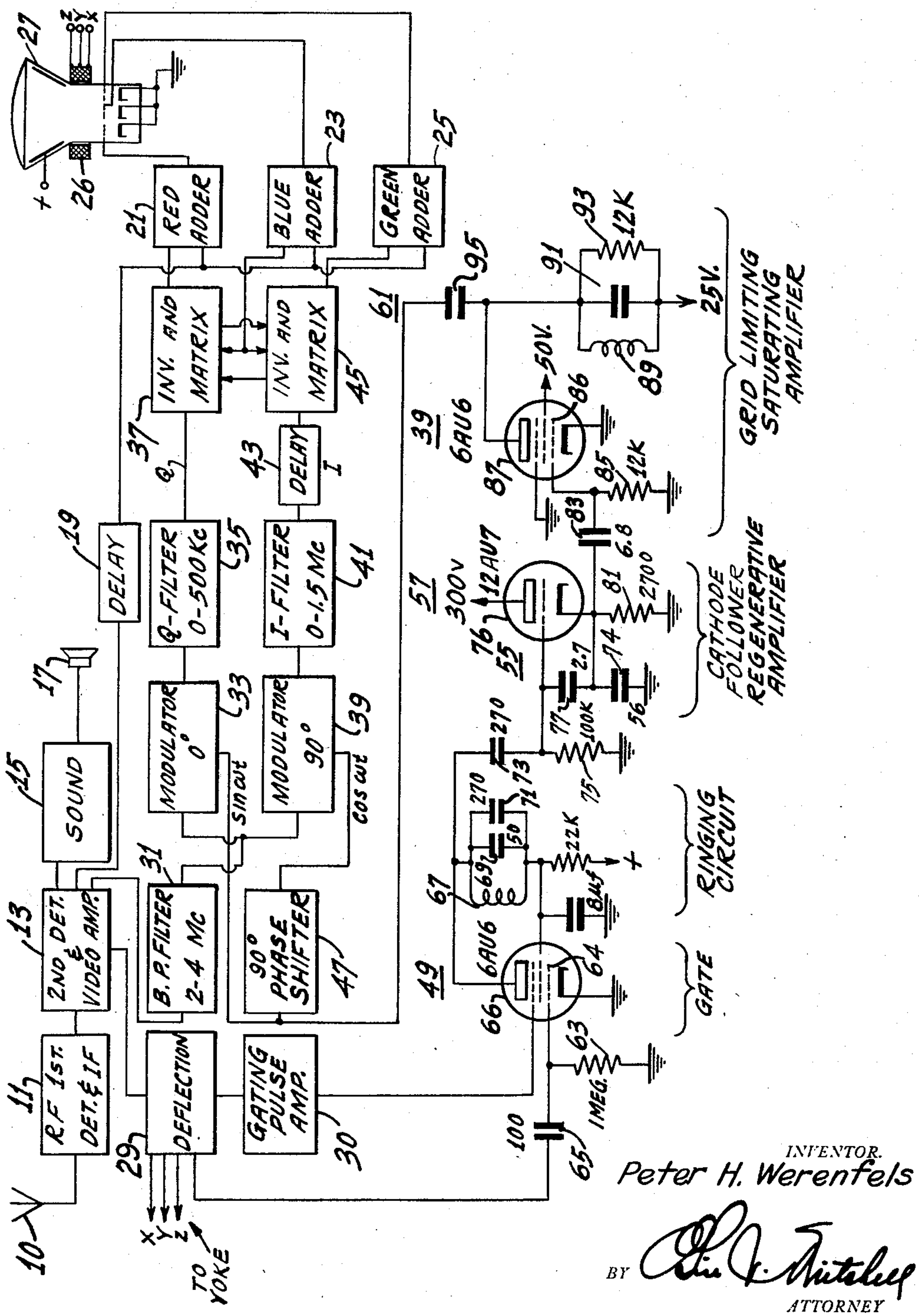
INVENTOR.
Peter H. Werenfels
BY [signature]
ATTORNEY United States Patent Office 2,848,529 Patented Aug. 19, 1958

2,848,529

COLOR TELEVISION SYNCHRONIZATION

Peter H. Werenfels, Princeton, N. J., assignor to Radio Corporation of America, a corporation of Delaware Application November 30, 1953, Serial No. 394,937

The terminal fifteen years of the term of the patent to be granted has been disclaimed 7 Claims. (Cl. 178—5.4)

The present invention relates to signalling circuits, and more particularly to color synchronization of the type employed in color television receivers.

Complete cooperation between the transmitter and receiver is essential in the successful operation of television equipment. As a result much emphasis is placed on the development and utilization of synchronizing methods. This is particularly true in color television wherein not only is it necessary to maintain accurate deflection scanning but it is also necessary to maintain accurate synchronism in the timing of component color selection.

In order to utilize the existing radio frequency spectrum most advantageously, there has been propored a color television system which conforms to a set of standards known as the NTSC compatible television standards which are described at page 88 of "Electronics" for February 1952. In this system, the transmission of a brightness signal is substantially the same as that conventionally employed for black and white television transmission. In addition, a color subcarrier wave, spaced from the main carrier wave by a frequency substantially equal to that of an odd multiple of one-half the line scanning frequency is employed to carry the chromaticity information.

The chromaticity information is produced in the form of two color difference signals, I and Q, having bandwidths of 1.5 mc. and 0.5 mc. respectively. By impressing these color difference signals upon the subcarrier in proper phase, the chromaticity information is included in the video signal and transmitted to the receiver where it is demodulated, separated into its primary or component color information and then applied to the output color image reproducer.

The reproduction of the proper color in a color television receiver is very highly dependent upon accurate timing of the color selection and the phases of the various signals which convey the color information which should be produced with considerable accuracy.

Synchronization is accomplished by the periodic transmission of a burst of a signal wave equal in frequency to that of the unmodulated subcarrier carrying this color information. A good description of the employment of a burst for color synchronization may be found in an article entitled "Recent Developments in Color Synchronization in the RCA Color Television System," published February 1950 by the Radio Corporation of America. In the modern color television system conforming to NTSC standards, this burst consists of approximately eight cycles of a 3.58 megacycle signal located on the back porch of the horizontal synchronizing pulse. The phase of the burst is 57° ahead of the phase of the I signal in the color sub-carrier.

In order to properly phase the I and Q signals with respect to the frequency of the burst, it is necessary to produce a signal whose frequency is 3.58 mc. in the receiver circuit. The most important aspect of this produced signal is that it maintain proper phase and frequency with respect to the phase of each burst signal and that it continue with this phase until the scanning line has been completely scanned at which point a new synchronizing pulse is formed followed by a new burst and the scanning process begins again. Once this phase has been established, assuming of course that the frequency is correct, the relative phases of the I and Q signals may then be themselves established using delay lines or phase shifting circuits of proper characteristics.

It is a primary object of the present invention to improve the timing of the color selection in a color television receiver.

Another object of this invention is to permit more accurate selection of color information.

Another object of this invention is to produce a color synchronizing signal of proper frequency and phase whose amplitude is maintained nearly constant for the duration of the horizontal scan.

A still further object of this invention is to utilize the combined properties of a ringing circuit, a cathode follower feedback circuit and a saturating limiter circuit.

According to this invention a ringing circuit having a frequency of response equal to the burst frequency is excited with the color television synchronizing burst signal. The ringing circuit is followed by a regenerative cathode follower amplifier circuit whose output is passed through a saturated self-biasing single-stage double-limited type amplifier to produce an output color-synchronization-signal of constant amplitude.

Other and incidental objects and advantages of this invention will become apparent from a reading of the following specification and an inspection of the accompanying drawing in which Figure 1 shows the basic elements of a color television receiver and includes in detail the complete circuitry involved with the ringing circuit color synchronizing signal source.

In order to provide for a better understanding of the present invention, a summary of the basic principles of transmission which conform to the NTSC standards for color television transmission are presented as follows, the description relating to both the formation of the color television image signal at the transmitter and the means of accommodating and utilizing this signal in the circuitry which comprises the modulator and demodulator of such signals.

The camera contains three pickup tubes or transducing elements which provide electrical signals corresponding to the red, green, and blue components of the scene to be televised. The signals are then matrixed or crossmixed to produce a luminance signal (M) and two chrominance signals, I and Q.

In the modulator section, the I and Q signals are modulated upon two subcarriers of the same frequency but 90° apart in phase. The modulators employed should be of the doubly-balanced type, so that both the carriers and the original I and Q signals are suppressed, leaving only the sidebands. Some sort of keying circuit must be provided to produce the color synchronizing bursts during the horizontal blanking intervals. To comply with the NTSC signal specifications, the phase of the burst should be 57° ahead of the I component (which leads the Q component by 90°). This phase position, which places the burst exactly 180° out of phase with the B–M component of the signal, was chosen mainly because it permits certain simplifications in receiver designs. Timing information for "keying in" the burst may be obtained from a "burst flag generator," which is a simple arrangement of multivibrators controlled by horizontal and vertical drive pulses.

In the mixer section, the M signal, the two subcarriers modulated by the I and Q chrominance signals, and the color synchronizing bursts are all added together. Provision is also made for the addition of standard synchronizing pulses, so that the output of the mixer section is a complete color television signal containing both picture and synchronizing information. This signal may then be put "on the air" by means of a standard television transmitter.

The basic operations performed in a compatible color receiver are described as follows: The antenna, R. F. tuner, I. F. strip, and second detector serve the same functions as the corresponding components of a black-and-white receiver. The sound signal may be obtained from a separate I. F. amplifier, or it may be obtained from the output of the second detector by using the well-known "intercarrier sound" principle. The video signal obtained from the second detector of the receiver is, for all practical purposes, the same signal that left the color television studio. The receiver up to this point is no different from a black-and-white receiver except that the tolerance limits on performance are somewhat tighter.

Turning now to Figure 1, it is seen that the video signal enters the receiver by way of the antenna 10 and passes through the R. F. amplifier; first detector; and I. F. amplifier 11 to the second detector and video amplifier 13. Here a separation of the video and sound signals occurs, the sound going through sound amplifier 15 to the loud speaker 17, the deflection synchronizing signals passing to the deflection circuit 29, the luminance signal passing through a delay line to the red adder 21, the blue adder 23, the green adder 25, and the chrominance signal passing by way of the band pass filter 31 to the I and Q signal circuits made up of the Q signal modulator 33 and the Q filter circuit 35 and the I signal modulator 39, the I signal filter 41 and the I signal delay line 43. The I and Q signals are passed through the inverter and matrix circuits 37 and 45 and are added to the luminance signal in the red adder 21, the blue adder 23 and the green adder 25 from which issue the proper red, green, and blue signals which go to the grids of the color kinescope 27.

The remaining circuit branch at the output of the second detector 13 makes use of the timing or synchronizing information in the signal. A conventional sync separator is used to produce the pulses needed to control the deflection circuits 29 which are also conventional. The high voltage supply for the kinescope ultor may be obtained either from a "flyback" supply associated with the horizontal deflection circuit or from an independent R. F. power supply. Many color kinescopes require convergence signals to enable the scanning beams to coincide at the screen in all parts of the picture area; the waveforms required for this purpose are readily derived from the deflection circuits 29.

The video signal is supplied from the detection circuits 29 to the burst gate 49 which is turned "on" only for a brief interval following each horizontal sync pulse.

Consider now in detail the color synchronizing signal circuit starting with the gating tube 49 on whose control grid is impressed the video signal which includes the horizontal synchronizing pulse and the burst. At the time that the horizontal synchronizing pulse and burst are applied to the gating tube 49 to the grid 64 of this tube a gating pulse from the gating pulse amplifier 80 is also applied to the suppressor grid of the gating tube 66. Thus at the moment that the tube is gated on by the gating signal the synchronizing burst passes through the ringing circuit 50 which consists of the inductance 67 in parallel with the condensers 69 and 71 which comprise a high Q resonant circuit. The voltage appearing across the ringing circuit 50 is then applied through the high impedance resistance-condenser network consisting of the condenser 73 and resistor 75 to the grid of amplifier tube 76 which is connected as a cathode follower. Included in this cathode follower circuit is a means of regeneration using the condenser network based on condenser 77 in series with condenser 74 which is so connected between grid and ground that the signal appearing across the cathode resistor 81 appears across condenser 74 and thereby causes regeneration.

The use of regeneration in this circuit is most important to the operation of the device both from a practical standpoint and an economical standpoint. Ringing circuits of the type consisting of a parallel LC network having sufficiently high Q to maintain amplitude throughout the entire scanning line are difficult to construct. Therefore, by utilizing regeneration in the amplifier which follows the ringing circuit it is possible to keep the signal amplitude built up for a long period of time using a resonant circuit having a much lower Q. The use of regeneration also has a highly practical constructional aspect. If regeneration is not used, a resonant circuit of very high Q is required; this usually involves a coil of very large dimensions. If regeneration is used, a resonant circuit of much lower Q can be used and the physical dimensions of the coil-condenser system are greatly reduced.

The anti-damping function is provided by the cathode follower circuit 57 which has the added function that inasmuch as it is a cathode follower circuit as shown, it cannot run away with itself and become an oscillator in its own right. The output of the cathode follower circuit appears across resistance 81 and is a low impedance source of the color synchronizing signal as produced by the ringing circuit. In order to further maintain the amplitude of color synchronizing signal as near constant as possible it is useful to pass the output of the cathode follower circuit through a limiting type of amplifier which involves grid limiting network consisting of the resistor 85 and the condenser 83, the saturating amplifier tube 87, and the resonant circuit 91. The time constant of the RC network consisting of the resistor 85 and the condenser 83 is fairly short thus enabling this circuit to follow the peaks of the sinusoidal wave being delivered by the cathode circuit of cathode-follower circuit 57; the grid, 86, of tube 87 will bias off during each cycle, resulting in the grid 86 permitting conduction during only a small portion of the cycle of the sinusoidal wave thereby producing the grid limiting action. In addition the potentials of the saturating amplifier tube 87 are such that the plate current saturates above a certain value of grid voltage. Therefore when the sinusoidal signals are applied to the grid 86 and its associated network, the output current which appears in the plate circuit of tube 87 as a result of the double limiting action will be a succession of clipped sine waves which being now a non-sinusoidal complex wave is composed of a fundamental and harmonics as prescribed by a normal Fourier series analysis of the particular waveform. The fundamental component of this complex waveform passes through the resonant circuit 91. The output voltage across this resonant circuit will be of constant amplitude and will have a frequency and phase which are dependent on the action of the ringing circuit 50. Note that this constancy of amplitude has been attained by the successive use of three anti-amplitude-decay actions, that afforded by the regenerative cathode follower circuit, that afforded by the grid limiting action, and that afforded by the plate limiting action.

The voltage across resonant circuit 61 is then applied to the Q modulator 33 and through the phase shifter 47 to the I modulator to provide for suitable demodulation of the chrominance signal.

Having described the invention, what is claimed is:

1. In a color television receiver system of the type employing a color synchronizing burst, a color synchronizing circuit comprising in combination, a ringing circuit means responsive to the frequency of said burst to develop electrical oscillations having a frequency equal to the frequency of said burst, means for applying said color synchronizing burst to said ringing circuit, an amplifier tube circuit having a grid and cathode, a resistor operatively connected from the cathode to a point of fixed potential, a pair of condensers connected in series, said series connected condensers connected from the grid of said amplifier tube to a point of fixed potential, the cathode connected end of said resistor connected to the mid terminal of said series connected condensers to furnish regeneration, means for applying the output of said ringing circuit means at the grid of said amplifier tube circuit, a saturating amplifier so connected that its output current saturates above a certain value of input voltage, a resonant circuit means responsive to the frequency of said burst and coupled to said saturating amplifier, means for utilizing the output signal of said regenerative-connected amplifier to drive said saturating amplifier, and means for utilizing the output signal of said saturating amplifier to drive said resonant circuit means, and means for utilizing the signal developed across said resonant circuit means for color selection in said color television receiver system.

2. In a color television receiver system of the type employing a scanning synchronizing pulse and a color synchronizing burst, a color synchronizing circuit comprising in combination, a signal gating circuit having a signal input terminal, an output terminal and a control terminal, means for applying a burst of color synchronizing signal to said input terminal, time delay and coupling means for applying a scanning synchronizing pulse to said control terminal to open the gate circuit to said synchronizing burst, a ringing circuit connected to said gating circuit output terminal and tuned to the frequency of said burst, a fixed potential terminal, an amplifier tube having an anode, a cathode, and control grid included in an amplifier tube circuit having a resistor connected from the cathode of said amplifier tube to a fixed potential terminal, a pair of condensers connected in series forming a condenser voltage-divider network which is connected from the grid of said amplifier tube to said fixed potential terminal, the cathode connected end of said resistor connected to the mid terminal of said condenser voltage-divider to furnish regeneration, means for utilizing output of said ringing circuit means in the grid circuit of said amplifier tube circuit, a saturating amplifier having an input circuit and output circuit, biasing means applied to said saturating amplifier such that its output current saturates above a certain value of input voltage, a resonant circuit means responsive to the frequency of said burst, means for coupling output circuit of said saturating amplifier to said resonant circuit means, means for utilizing the output of said regenerative-connected amplifier into the input circuit of said saturating amplifier, and means for utilizing the output signal of said resonant circuit means for color synchronizing in said color television receiver system.

3. A synchronizing circuit of the type employing a synchronizing burst, the frequency of which burst is selected as a standard, comprising in combination, a ringing circuit means responsive to the frequency of said burst to develop electrical oscillations having a frequency and phase equal to frequency and phase of said burst, a signal gating circuit operatively connected for applying said synchronizing burst to said ringing circuit means during interval when the burst is present, a reference level terminal, an amplifier tube having an anode, a cathode and a control grid, said amplifier tube included in a circuit having a resistor from the cathode to said reference level terminal and a pair of condensers connected in series and forming a condenser voltage divider network, said network connected from grid of said amplifier tube to said reference level terminal, the cathode connected end of said resistor connected to the mid terminal of said condenser voltage divider network to furnish regeneration, means for coupling the output of said ringing circuit means to drive the grid circuit of said amplifier tube, a saturating amplifier having an input circuit and an output circuit and adjusted such that its output current saturates above a certain value of input voltage to the input circuit, a resonant circuit means responsive to the frequency of said burst, means for utilizing the output of said regenerative-connected amplifier in the input circuit of said saturating amplifier, means for coupling said output circuit of said saturating amplifier to said resonant circuit means, a pair of output terminals, and means for coupling said resonant circuit means to said output terminals.

4. A color television receiver system of the type having deflection circuits and employing a video signal including a color synchronizing burst following the horizontal synchronizing pulse, the frequency of which burst is employed for color selection, a color synchronizing circuit comprising in combination, a signal gating tube having an output circuit and at least a signal control electrode, a gating control electrode, a burst-frequency resonant circuit, said burst-frequency resonant circuit connected in said gating tube output circuit, means for applying said video signal to said signal control electrode, a gating pulse source coupled to said color television receiver deflection circuit, means for applying said gating pulse to said gating control electrode in proper time phase, a reference level terminal, an amplifier tube having an anode, cathode, and control grid, said amplifier tube connected into a circuit having a resistor from cathode to said reference level terminal and a pair of condensers in series comprising a condenser voltage-divider network which is connected from grid of said amplifier tube to said reference level terminal, the cathode end of said resistor connected to mid terminal of said condenser voltage-divider to furnish regeneration, means for coupling the output of said ringing circuit means to the grid of said amplifier tube, a saturating amplifier having an input circuit and an output circuit, said saturating amplifier connected so that its output current saturates above a certain value of voltage applied to input circuit of said saturating amplifier, a second resonant circuit means responsive to the frequency of said burst, means for coupling the output of said regenerative-connected amplifier into input circuit of said saturating amplifier, and means for utilizing the output of said second resonant circuit means for color selection in said color television receiver circuit.

5. The invention as set forth in claim 4 and wherein the means for coupling the output of said ringing circuit means in the grid of said amplifier tube circuit is a circuit which presents a high impedance to said burst-frequency resonant circuit to prevent undue damping of said burst-frequency resonant circuit, and wherein output of said amplifier tube circuit is obtained from said resistor connected between said cathode and said reference level terminal to furnish a low impedance output source.

6. In a color television receiver system of the type employing a color synchronizing burst, the frequency of which is to be employed for color selection, a color synchronizing circuit comprising in combination, a ringing circuit means responsive to frequency of said burst to develop electrical oscillations having a phase and frequency equal to the phase and frequency of said burst, means for applying said color synchronizing burst to said ringing circuit means, reference level connection, an amplifier tube having an anode, a cathode, and a control grid, said amplifier tube connected in a circuit having a resistor from cathode to said reference level connection and a pair of condensers in series comprising a condenser voltage-divider network which is connected from grid of said amplifier tube to said reference level connection, the cathode end of said resistor connected to mid terminal of said condenser voltage-divider to furnish regeneration, means for coupling output of said ringing circuit means to grid of said amplifier tube, a grid-limiting saturating amplifier tube circuit having an input circuit and an output circuit adjusted to saturate its output circuit current above a certain value of voltage to its input circuit and with a dissipative electron storage capacity network in said input circuit so that said grid-limiting saturating amplifier tube circuit biases off during each cycle thereby producing an additional emission-limiting action, a resonant circuit means responsive to the frequency of said burst, means for coupling output of said regenerative-connected amplifier into input circuit of said grid limiting saturating amplifier tube circuit, and means for utilizing output of said resonant circuit means for color selection in said color television receiver circuit.

7. A color television receiver system of the type including deflection circuits and employing a video signal including a color synchronizing burst following the horizontal synchronizing pulse, the frequency of which burst is employed for color selection, a color synchronizing circuit comprising in combination, a signal gating tube having an output circuit and at least a signal control electrode, a gating control electrode, a burst-frequency resonant circuit connected in said gating tube output circuit, means for applying video signal to said signal control electrode, a gating pulse generator line, means for applying said gating pulse to said gating control electrode in proper time phase to open the gate to said color synchronizing pulse, a reference level terminal, an amplifier tube having an anode, a cathode, and a control grid, said amplifier tube connected in a circuit having a resistor from cathode to said reference level terminal and a pair of condensers in series comprising a condenser voltage-divider network which is connected from grid of said amplifier tube to said reference level terminal, the cathode end of said resistor connected to mid terminal of said condenser voltage-divider to furnish regeneration, means for coupling the output of said ringing circuit means to the control grid of said amplifier tube, an amplifier tube in a grid-limiting saturating amplifier tube circuit having an input circuit and an output circuit, said grid limiting saturating amplifier tube circuit connected that its output circuit current saturates above a certain value of voltage applied to said input circuit and with a dissipative electron storage capacity network employing in its input circuit to bias off said amplifier tube during each cycle thereby producing an additional emission limiting action, a resonant circuit means responsive to the frequency of said burst, means for coupling the output of said regenerative-connected amplifier into input circuit of said grid limiting saturating amplifier tube circuit, and means for utilizing output of said resonant circuit means for color selection in said color television receiver circuit.

References Cited in the file of this patent

UNITED STATES PATENTS

| | | |
|---|---|---|
| 2,597,743 | Millspaugh | Apr. 20, 1952 |
| 2,635,140 | Dome | Mar. 14, 1953 |
| 2,653,187 | Luck | Sept. 22, 1953 |
| 2,712,568 | Avins | July 5, 1955 |
| 2,713,612 | Nero | July 19, 1955 |

FOREIGN PATENTS

| | | |
|---|---|---|
| 514,249 | Belgium | Sept. 17, 1952 |

OTHER REFERENCES

Color TV, Rider publication, March 1954, page 142 (copy in Scientific Library).